United States Patent [19]
Gillespie

[11] Patent Number: 6,125,032
[45] Date of Patent: Sep. 26, 2000

[54] COMPUTER MOUSE HOUSE AND INTERACTIVE SYSTEM

[76] Inventor: Andrew James Gillespie, 26035 Moulton Pkwy., No. 266, Laguna Hills, Calif. 92653

[21] Appl. No.: 09/164,974

[22] Filed: Oct. 1, 1998

[51] Int. Cl.[7] .............................. H05K 5/00; H05K 7/00; H05K 7/16; A63B 71/00

[52] U.S. Cl. ........................ 361/683; 361/724; 361/683; 273/148 R

[58] Field of Search ....................... 273/148 R; 361/724, 361/683

[56] References Cited

U.S. PATENT DOCUMENTS

| | | | |
|---|---|---|---|
| D. 328,475 | 8/1992 | Gould et al. | D21/23 |
| D. 368,495 | 4/1996 | Rypinski | D21/32 |
| D. 393,300 | 4/1998 | Andrews et al. | D21/206 |
| D. 394,055 | 5/1998 | Tyler | D14/121 |
| 629,891 | 8/1899 | Cunningham . | |
| 4,422,640 | 12/1983 | Tamarkin | 273/148 R |
| 4,830,619 | 5/1989 | Marion | 434/382 |
| 4,991,935 | 2/1991 | Sakurai | 350/239 |
| 5,135,440 | 8/1992 | Smollar et al. | 472/128 |
| 5,722,348 | 3/1998 | Phillips et al. | 119/452 |
| 5,735,619 | 4/1998 | Myint | 400/488 |
| 5,805,143 | 9/1998 | Myers | 345/163 |

*Primary Examiner*—Leo P. Picard
*Assistant Examiner*—Tung Minh Bui
*Attorney, Agent, or Firm*—Stetina Brunda Garred & Brucker

[57] ABSTRACT

A user interactive decorative array for providing a more friendly computing environment through the use of computer accessories revolving around a common theme. The array comprises a collection of elements all having artistic indicia of a common theme selectable by the computer user. Preferably, the array comprises a mouse house for storage of a computer mouse, a mouse pad, an artistic backdrop, a wrist pad and mouse pals. The appearance of the elements is configured in accordance with the common theme selected by the computer user. Additionally, children can play with individual components of the array in order to enhance their computing experience.

13 Claims, 2 Drawing Sheets

COMPUTER MOUSE HOUSE AND INTERACTIVE SYSTEM

FIELD OF THE INVENTION

The present invention generally relates to computer accessories and more particularly to a system of accessories with a common theme to provide a user friendly computing environment.

BACKGROUND OF THE INVENTION

Children are beginning to use computers at younger and younger ages. However, presently most computer systems have the same appearance. As such, children may want to personalize their computer system's appearance to reflect their tastes and interests and make using a computer more enjoyable and fun. Children also have short attention spans and constantly need to be stimulated while using a computer. Presently, there is not provided a system of accessories revolving around a common theme that children can play with while working on their computer in order to stimulate their interest in computing.

Workers spending all day in front of a computer terminal need to be able to enjoy their surroundings in order to increase productivity. As such, workers personalize their work space to reflect passions and hobbies in order to enhance the working environment.

Currently, the color of most computer systems is some variation of the color "putty". However, recently attempts have been made to humanize the computer's appearance by changing the color of the system and adding color accents, yet this has not been overly successful because of the different tastes and preferences of computer users. Additionally, a computer user cannot customize the appearance the his or her own computer to his or her own tastes because computer manufacturers mass produce their products in bulk.

Therefore, there is a need for computer accessories that allow the user to personalize his or her computer and can make computing fun for youngsters. The present invention addresses the above-mentioned deficiencies in computer system appearance by providing a system of accessories with a common theme to accentuate the appearance of the computer system. Additionally, children can play with the different elements of the system in order to make using a computer more fun.

SUMMARY OF THE INVENTION

In accordance with the preferred embodiment of the present invention there is provided a decorative array for use with a computer system having a monitor, keyboard and computer pointing device (mouse) with a predetermined size. The array comprises an enclosure or mouse house sized and configured to define an internal area which exceeds the size of the mouse. Additionally, an opening exceeding the size of the mouse is formed in the enclosure such that the mouse is fully insertable into the internal area of the enclosure via the opening. The enclosure can have artistic indicia of a common theme disposed thereon that is selectable by the computer user and may be used with a mouse pad wherein both the enclosure and the mouse pad contain artistic indicia of the same common theme.

If the enclosure is used with a mouse pad, the mouse pad has a computer pointing device work surface that supports the enclosure and is used in facilitating the operation of the computer pointing device. Therefore, the opening in the enclosure is disposed on a surface that is adjacent and perpendicular to the working surface of the pad. As such, the computer pointing device can be inserted into the structure through the opening while still maintaining contact with the working surface of the pad.

In order to secure the structure to the pad, the pad has at least one peg mounted to the working surface of the pad and at least one peg opening formed in a bottom surface of the enclosure corresponding to a peg secured in the mouse pad. The peg openings are sized such that the pegs are insertable into the corresponding peg opening of the enclosure to thereby secure the structure to the pad.

The present invention also comprises a backdrop disposed on the monitor wherein the backdrop has artistic indicia of the common theme disposed thereon. The backdrop is constructed from a paper material and can be secured to the monitor through the use of adhesive tape.

Furthermore, the decorative array of the present invention comprises at least one figurine or mouse pal that is used in conjunction with the computer monitor, the keyboard, or the mouse house. The mouse pals are figurines with artistic indicia of the common theme disposed thereon that can be used with all elements of decorative array. Additionally, the array can further comprise a screen saver with artistic indicia of the common theme programmable into the computer system and for use with the monitor. In the preferred embodiment of the present invention, a keyboard wrist pad with artistic indicia of the common theme can also be included in the decorative array and is placed adjacent to the keyboard.

BRIEF DESCRIPTION OF THE DRAWINGS

These as well as other features of the present invention, will become more apparent upon reference to the drawings wherein.

DETAILED DESCRIPTION OF THE PREFERRED EMBODIMENT

Figure 1:
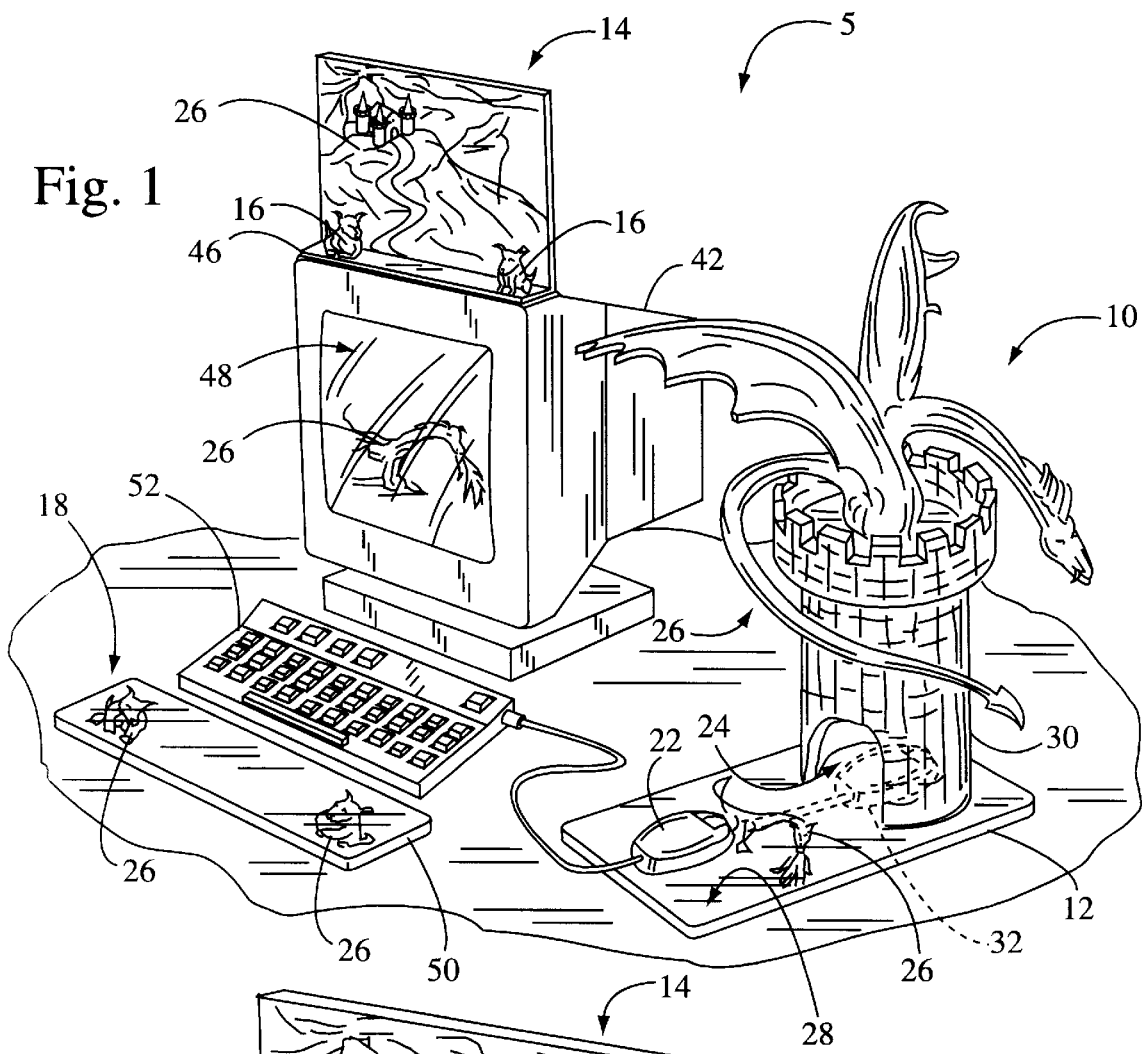
FIG. 1 is a perspective view of the decorative array of the present invention in use with a computer system.

Referring now to the drawings wherein the showings are for purposes of illustrating a preferred embodiment of the present invention only, and not for purposes of limiting the same, FIG. 1 perspectively illustrates a thematic, user interactive decorative array retrofit 5 for use with a computer system. The decorative array 5 comprises a plurality of elements including an enclosure or mouse house 10, a mouse pad 12, a backdrop 14, a figurine or mouse pal 16, and a wrist pad 18. All of the individual elements of the array 5 contain artistic indicia of a common theme or appearance. As shown in FIG. 1, as by way of illustration only and not by way of limitation, the appearance of the individual elements revolves around a fantastical medieval theme containing dragons, castles and gargoyles. However, this is not the only possible theme since computer users and children have different tastes and imaginations. As such it is possible to have a tropical theme whereby the elements have artistic indicia or appearance relating to palm trees, beaches, and fish or the elements have a sports theme with artistic indicia relating to baseball or football. Therefore, the present theme presented in the drawings is illustrative for showing a possible appearance and theme of the elements but it is not the only theme available for use.

The array 5 is adaptable for use on any type of computer system wherein the user wishes to accentuate the appearance thereof. The combination of elements comprising the system are not the only possible configuration available and may vary according to user preference or the theme used in array 5. For example, if the theme of array 5 is a military theme for young boys, then the array 5 could contain a plurality of mouse pals 16 in the form of soldiers that the child could play with. Alternatively, the array 5 does not necessarily need to have each element because some users may not prefer to use a certain component such as the wrist pad 18. Therefore, the present combination of elements is illustrative of a configuration possible and therefore not limiting.

The mouse house 10 of the array 5 has a generally cylindrical configuration and is provided with artistic indicia 26 of a castle turret with a dragon. The mouse house 10 forms an enclosure that is used for the storage of a mouse or computer pointing device 22. As seen in FIG. 1, the mouse house 10 has an opening 24 formed therein for inserting and removing pointing device 22. Additionally, mouse house 10 can be attached to a mouse pad 12 that, as indicated above, is an element of array 5 and used to facilitate the operation of the computer pointing device 22.

Figure 3:
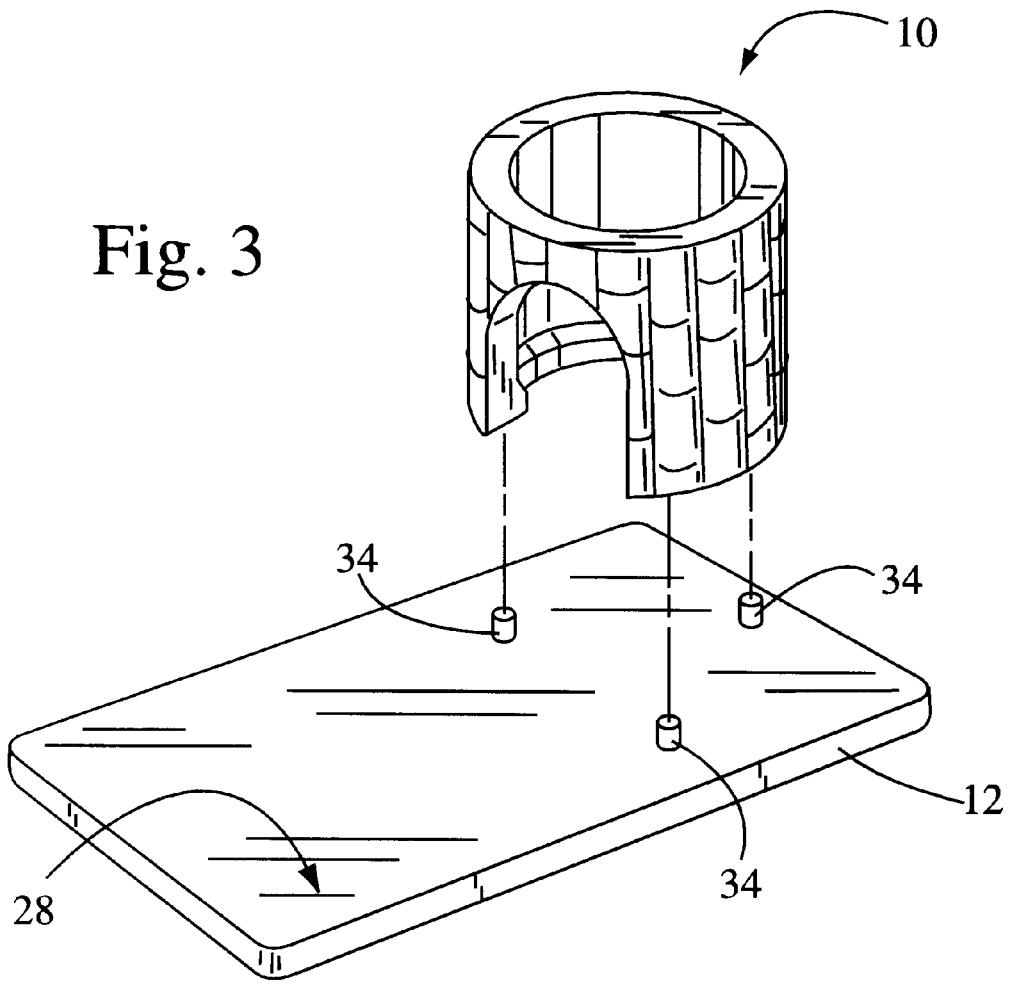
FIG. 3 is a perspective view of an enclosure and mouse pad constructed in accordance with the present invention.
Figure 4:
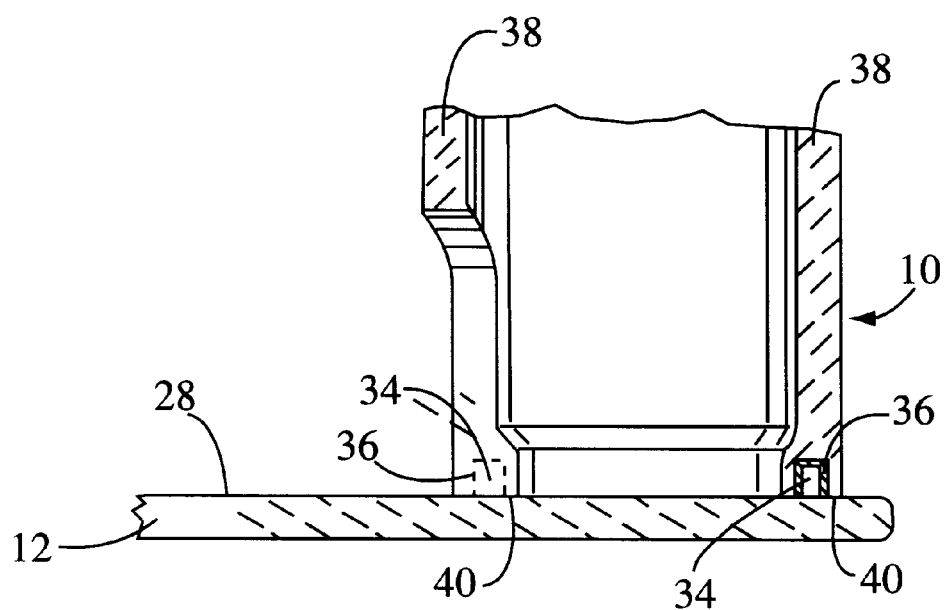
FIG. 4 is a cross-sectional view of the enclosure and mouse pad of FIG. 3.

As seen in FIG. 3, a mouse house 10 may be secured to a mouse pad 12 through the use of pegs 34. The pegs 34 are securely mounted to a working surface 28 of mouse pad 12 either frictionally or through the use of an adhesive tape or other securing method such as an adhesive glue. Mouse pad 12 can be a previously existing mouse pad that the user wishes to install a mouse house onto or it can be the mouse pad 12 that is used with the decorative array 5. Therefore, as shown in FIG. 4, the mouse house 10 is formed with peg openings 36 sized such that the pegs 34 are insertable into peg openings 36. As a result, the mouse house 10 can be maintained in a fixed position on working surface 28 of mouse pad 12 by placing mouse house 10 onto pegs 34. In accordance with the preferred embodiment of the present invention, the peg openings 36 are bores formed in enclosure wall 38 that are sized slightly larger than pegs 34. The bores radiate inwardly from the bottom surface 40 of mouse house 10 to thereby facilitate alignment with mouse pad 12. The use of pegs 34 that are insertable into mouse house 10 aid in exchanging mouse house 10 with other mouse houses with different themes selected by the user.

Alternatively, the mouse house 10 can be secured to mouse pad 12 with other attachment methods. It is possible 20 to secure mouse house 10 with an adhesive glue spread around the bottom surface 40 of mouse house 10 such that the mouse pad 12 and mouse house 10 are glued together as one unit on surface 28. It is also possible to use an adhesive tape to join the mouse pad 12 with the mouse house 10 or it is contemplated that mouse house 10 may simply be placed on the working surface 28 of mouse pad 12 without the use of an adhesive. However, in that instance, the mouse house 10 may shift position on mouse pad 12 while inserting and removing mouse 22.

The mouse pad 12 can be manufactured from a rectangular segment of an elastic foam material which aids in the rolling or gliding operation of the computer pointing device 22 when used thereon. Therefore, the opening 24 in mouse house 10 is preferably formed on a structure surface 30 of the enclosure that is adjacent and perpendicular to working surface 28 of mouse pad 12. As such, the computer pointing device 22 can be rolled or glided into mouse house 10 while still maintaining contact with the working surface 28 of mouse pad 12. As seen in FIG. 1, the mouse house 10 stores the computer pointing device 22 while not in use in storage position 32 shown by the dashed line representation of computer pointing device 22.

As previously mentioned, the specific appearance of the mouse house 10 and mouse pad 12 will be dependent upon the theme chosen for decorative array 5. Therefore, it is understood that mouse house 10 and mouse pad 12 may have different shapes or appearances. For example, if array 5 is based upon an Egyptian theme, then the enclosure or mouse house 10 may be formed in the shape of a pyramid. If the theme of array 5 is a tropical theme, then the mouse pad 12 may be shaped in the form of a tropical fish. It is not necessary that mouse house 10 always be a cylindrical enclosure and mouse pad 12 be rectangular. It is only necessary that mouse house 10 be slightly larger and have an opening that exceeds the size of mouse 22 so that mouse 22 is fully insertable into mouse house 10. Similarly, mouse pad 12 needs to be a size whereby mouse 22 can be used thereon.

Therefore, in the preferred embodiment of the present invention, the decorative array 5 includes a mouse pad 12 with artistic indicia 26 of a theme common to the other elements of the decorative array 5. As seen in FIG. 1, the mouse pad 12 has artistic indicia 26 of dragons from the fantastical medieval theme. The artistic indicia 26 is produced on mouse pad 12 either by a silk screening process or any other printing technique currently known in the art. Alternatively, artistic indicia 26 may be applied to a mouse pad 12 with a decal that can be affixed to the mouse pad 12.

Figure 2:
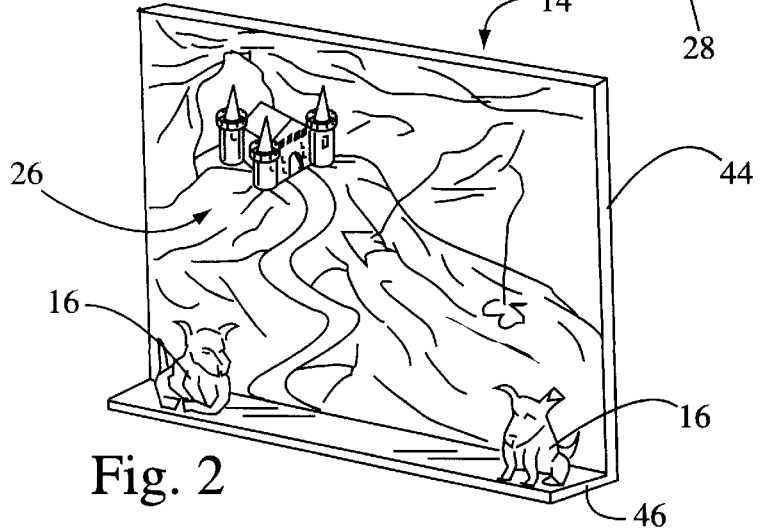
FIG. 2 is a perspective view of a backdrop with figurines used in the decorative array of the present invention.

The decorative array 5 can also include a backdrop 14 for placement on a computer monitor 42 in the preferred embodiment of the present invention. The backdrop 14 is a display that can be placed on the top and/or sides of monitor 14 so as to encompass the exterior of monitor 14 without covering the associated display area of monitor 14. As seen in FIG. 2, the backdrop 14 contains indicia 26 of the common theme on a rectangular partition 44. Additionally, it is contemplated that partition 44 may be a frame (not shown) that surrounds monitor 42 with a cutout in the center of the frame at the position of the monitor screen to allow viewing of the screen. However, as shown in FIGS. 1 and 2, backdrop 14 comprises a rectangular mounting segment 46 secured to the bottom of partition 44 to form an "L" shaped bottom portion of backdrop 14 that is used to support and secure partition 44 to monitor 42. It is contemplated that mounting segment 46 is secured to monitor 42 with either adhesive tape or an easily removable mounting method whereby backdrop 14 can be changed to other backdrops with other themes quickly and easily. The partition 44, along with mounting segment 46, can be manufactured from either a paper or plastic material, while the artistic indicia 26 can be applied with a printing technique or as an adhesive decal affixed to partition 44.

Additionally, as will be explained in further detail below, mounting segment 46 can be used as a stage for mouse pals 16 and therefore artistic indicia 26 may be sized accordingly to match. Ideally, backdrop 14 is also sized in relation to the size of monitor 42 so that the backdrop 14 is the same width of monitor 14. Therefore, it is contemplated that backdrop 14 may be supplied in different sizes dependent upon the size of monitor 42.

Furthermore, a screen saver 48 for monitor 42 can be used in the decorative array 5. The screen saver 48 is a computer program constructed with artistic indicia 26 of the common theme and programmable into the computer system. As will be recognized, when the computer system is not being used, yet is still powered on, the artistic indicia 26 is displayed upon the viewing screen of monitor 42. As such, the screen saver 48 is constructed with programming techniques currently known in the art in order for screen saver 48 to be used with different types of computer and operating systems.

The decorative array 5 of the present invention may further comprise at least one figurine or mouse pal 16. A mouse pal 16 is a movable figurine with artistic indicia of the common theme disposed thereon that children can play with. As shown in FIGS. 1 and 2, the mouse pal 16 is configured as a gargoyle in accordance with the common theme used throughout the array 5. The mouse pal 16 is movable such that it can be placed anywhere the computer user wishes such as on the mounting segment 46 of backdrop 14 as shown in FIGS. 1 and 2. The mouse pal 16 can be sized to match the scale of the mouse house 10 and backdrop 14 and may be manufactured from a plastic material. Additionally, a mouse pal 16 may have moveable parts such as arms and legs in order to configure the mouse pal 16 into different poses.

Furthermore in accordance with the present invention, a keyboard wrist pad 18 is also provided in the decorative array 5. The wrist pad 18 can be a rectangular segment 50 of a soft elastic foam material that is positionable adjacent to the computer keyboard 52. Therefore, when the computer operator is typing on keyboard 52, the wrists of the operator rest on wrist pad 18 to relieve fatigue. Similar to the other elements of array 5, artistic indicia 26 of the common theme are produced upon wrist pad 18. As shown in FIG. 1, the artistic indicia 26 on wrist pad 18 are gargoyles in keeping with the medieval theme. However, as previously stated, the artistic indicia may be any artwork in accordance with the overall common theme of the array 5. Additionally, the shape of wrist pad 18 may vary accordingly to reflect the theme of the array 5. For example, wrist pad 18 may be wave-shaped to reflect an oceanic theme. Furthermore, the artistic indicia 26 may be printed onto the foam segment 50 through the use of a silk screening process or other technique currently known in the art or artistic indicia 26 may be affixed with an adhesive decal.

The above described components comprise a decorative array 5 of computer accessories that personalize the appearance of the computing environment with a common theme and make using a computer more enjoyable for children and adults. Ideally, the array 5 is well suited for children who wish to have a fantasy environment for their computer. Children can play with all the elements of the array 5; especially the mouse pals 16, mouse house 10 and backdrop 14 while at their computer. It is additionally contemplated that computer programs and games can be created incorporating the common theme. The computer games and programs would be interactive with the array 5 wherein the mouse pals are used as elements of the game or program.

Additionally, the array 5 can be adaptable for a working environment whereby a worker can personalize the appearance of his or her workstation or the appearance of their computer system. Therefore for working adults, more mature themes would be developed such as sports or landscape themes. Additionally, the array 5 could include other theme based accessories that could be placed on the worker's chair or desk. As such, the user interactive decorative array 5 can help humanize the computing and office environment thereby increasing productivity.

Additional modifications and improvements of the present invention may also be apparent to those of ordinary skill in the art such as having different accessories and themes. Thus, the particular combination of parts described and illustrated herein is intended to represent only certain embodiments of the present invention, and is not intended to serve as limitations of alternative devices within the spirit and scope of the invention.

What is claimed is:

1. A decorative array for use with a computer system having a monitor, a keyboard and a computer pointing device of a predetermined size, the array comprising:

a mouse pad having a working surface;

an enclosure sized and configured to define an internal area which exceeds the size of the computer pointing device, the enclosure being attached to the mouse pad; and an opening formed within the enclosure having a size which exceeds the size of the computer pointing device such that the computer pointing device is fully insertable into the internal area of the enclosure via the opening, the opening being disposed within the enclosure so as to extend adjacent to and in generally perpendicular relation to the working surface of the mouse pad such that the computer pointing device may be inserted into the enclosure while being maintained in contact with the mouse pad;

the enclosure having artistic indicia of a common theme disposed thereon.

2. The decorative array of claim 1 wherein the mouse pad has artistic indicia of the common theme disposed thereon.

3. The decorative array of claim 2 further comprising:

at least one peg opening formed in the enclosure; and at least one peg secured to the working surface of the mouse pad and insertable into the peg opening of the enclosure to facilitate the attachment of the enclosure to the mouse pad.

4. A decorative array for use with a computer system having a monitor, a keyboard and a computer pointing device of a predetermined size, the array comprising:

a paper backdrop disposed on the monitor;

an enclosure sized and configured to define an internal area which exceeds the size of the computer pointing device; and an opening formed within the enclosure having a size which exceeds the size of the computer pointing device such that the computer pointing device is fully insertable into the internal area of the enclosure via the opening;

the enclosure and the backdrop having artistic indicia of a common theme disposed thereon.

5. The decorative array of claim 4 wherein the backdrop is configured to be mountable to the monitor.

6. A decorative array for use with a computer system having a monitor, a keyboard and a computer pointing device of a predetermined size, the array comprising:

a computer monitor screen saver programmable into the computer system and operative to display artistic indicia of a common theme on the monitor while the computer system is not in use;

an enclosure sized and configured to define an internal area which exceeds the size of the computer pointing device; and an opening formed within the enclosure having a size which exceeds the size of the computer pointing device such that the computer pointing device is fully insertable into the internal area of the enclosure via the opening;

the enclosure having artistic indicia of the common theme disposed thereon.

7. A decorative array for use with a computer system having a monitor, a keyboard and a computer pointing device operative on a generally planar surface and having a predetermined size, the array comprising:

an enclosure placeable upon the planar surface and having artistic indicia of a common theme disposed thereon, the enclosure being sized and configured to define an internal area which exceeds the size of the computer pointing device; and an opening formed in the enclosure having a size which exceeds the size of the computer pointing device such that the computer pointing device is fully insertable into the internal area of the enclosure via the opening when the enclosure is placed on the planar surface.

8. The decorative array of claim 7 wherein the generally planar surface is a mouse pad.

9. The decorative array of claim 7 further comprising a backdrop disposed on the monitor and having artistic indicia of the common theme disposed thereon.

10. The decorative array of claim 7 further comprising at least one figurine having artistic indicia of the common theme disposed thereon for use with the enclosure.

11. The decorative array of claim 7 further comprising a keyboard wrist pad disposed adjacent to the keyboard and having artistic indicia of the common theme disposed thereon.

12. The decorative array of claim 7 further comprising a computer monitor screen saver programmable into the computer system and operative to display artistic indicia of the common theme on the monitor while the computer system is not in use.

13. The decorative array of claim 8 wherein the mouse pad has artistic indicia of the common theme.

* * * * *